March 4, 1924.
J. W. PENCE
TIRE REMOVER
Filed Jan. 2, 1923   2 Sheets-Sheet 1
1,486,030
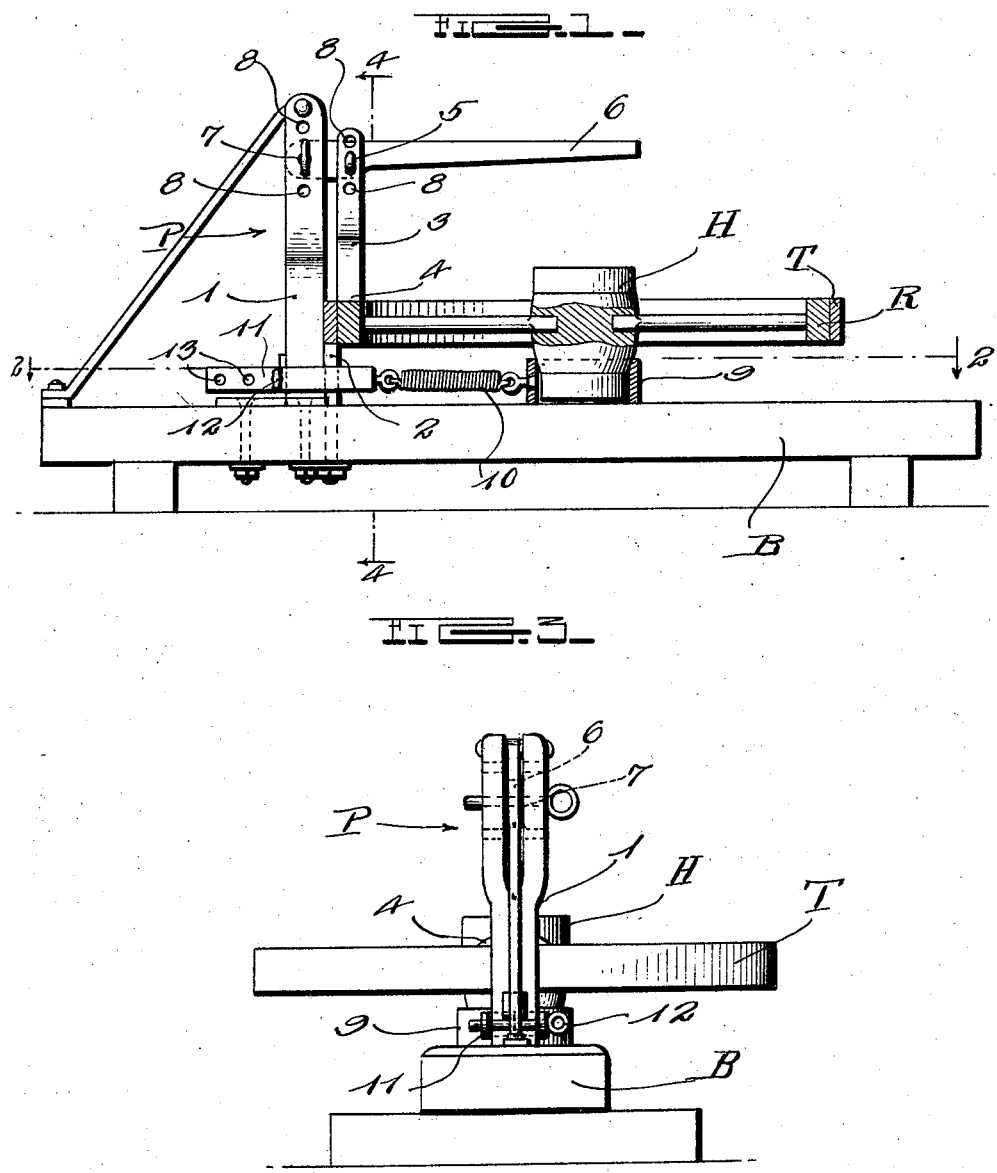

March 4, 1924.  
J. W. PENCE  
TIRE REMOVER  
Filed Jan. 2, 1923  
1,486,030  
2 Sheets-Sheet 2
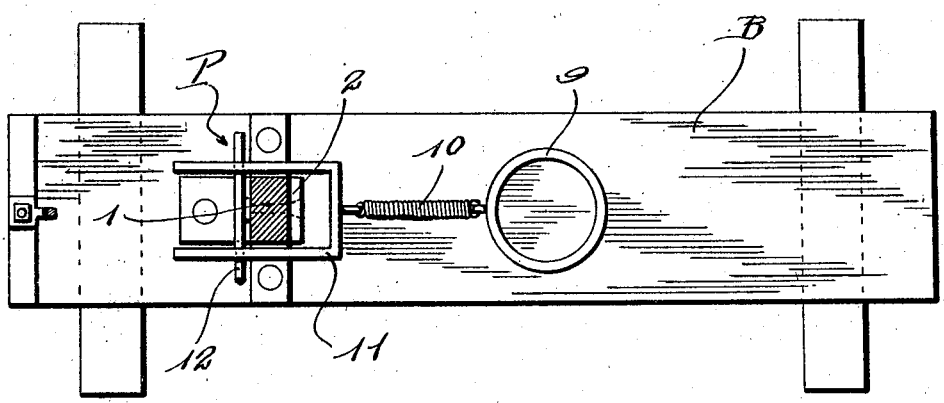
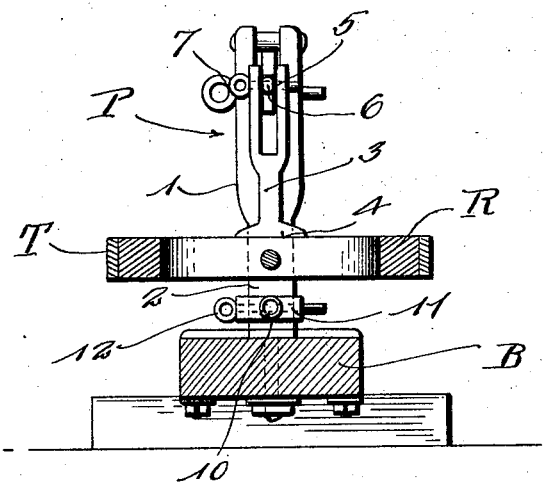
Inventor  
J. W. Pence
Witness
Attorneys Patented Mar. 4, 1924.

1,486,030

UNITED STATES PATENT OFFICE.

JOHN W. PENCE, OF BUFFALO, KANSAS, ASSIGNOR OF ONE-HALF TO GEORGE B. BLACKBURN, OF CHANUTE, KANSAS.

TIRE REMOVER.

Application filed January 2, 1923. Serial No. 610,301.

*To all whom it may concern:*

Be it known that I, JOHN W. PENCE, a citizen of the United States, residing at Buffalo, in the county of Wilson and State of Kansas, have invented certain new and useful Improvements in Tire Removers; and I do declare the following to be a full, clear, and exact description of the invention, such as will enable others skilled in the art to which it appertains to make and use the same.

My invention relates to improvements in wheelwright machines and more particularly to devices for removing metal tires from carriage and wagon wheels, the principal object of the invention being to provide an improved means for holding the wheel properly engaged with the tire removing press which includes a ledge upon which the tire rests and a thrust bar for pushing the rim down from the tire.

A further object of the invention is to provide a wheel removing device which will be simple and inexpensive and may be easily operated upon wheels of different sizes.

With the foregoing in view, the invention resides in the novel subject matter hereinafter described and claimed, the description being supplemented by the accompanying drawings.

Figure 1 is a side elevation of a tire remover constructed in accordance with my invention, showing a wagon wheel in section thereon.

Figure 2 is a horizontal sectional view as indicated by line 2—2 of Fig. 1.

Figure 3 is an end elevation.

Figure 4 is a vertical transverse section as indicated by line 4—4 of Fig. 1.

In the drawings above briefly described, B designates a suitable horizontally elongated base from one end of which a press P rises. This press includes a vertical standard 1 against which the wheel tire T is adapted to abut, one side of said standard having a ledge 2 upon which said tire rests as seen in Figure 1, whereby a downward push on the rim R will force said rim from engagement with the tire. For so depressing the rim, I provide a vertically disposed thrust bar 3 having an enlarged rim engaging foot 4 at its lower end while its upper end is pivoted at 5 to a hand lever 6 which is fulcrumed at 7 to the upper end of the standard 1. The standard and the thrust bar are both preferably bifurcated to receive the lever 6 and are each provided with a plurality of vertically spaced openings 8 which permit adjustment of the pivots 5 and 7, as occasion may require.

The hub H of the wheel rests upon the base B when its tire is engaged with the ledge 2 and I provide a novel wheel engaging member actuated by a spring for holding the wheel in proper engagement with the press. In the preferred form of construction, a collar 9 rests slidably on the base B to receive the hub H and this collar is connected by a coiled spring 10 with a U-shaped yoke 11 which straddles the lower end of the standard 1, a pin 12 being insertible through any of the openings 13 in the arms of the yoke, after the spring 10 has been placed under proper tension, whereby said pin will engage the standard and will cause the spring to move the wheel toward and hold the tire in tight contact with the standard, so that said tire will be at all times properly engaged with the ledge 2, in readiness for operation of the thrust bar 3 by means of the lever 6.

By constructing the device in or substantially in the manner shown and described, it will be simple and inexpensive, yet will be highly efficient for removing tires, now requiring a very arduous and lengthy operation. Since excellent results may be obtained from the details disclosed, they are preferably followed, but within the scope of the invention as claimed, numerous minor changes may of course be made.

I claim.

1. A tire remover comprising a press for forcing the wheel rim from the tire, said press having a ledge to support the tire and a tire engaging stop to prevent movement of the wheel rim onto said ledge, means for supporting the wheel with its tire resting on said ledge, including a movable hub-receiving collar, and a spring having one end anchored to a portion of the press and its other end engaged with said collar to move the wheel and retain the tire in contact with said stop when the spring is stretched.

2. A tire remover comprising a press for forcing the wheel rim from the tire, said press having a ledge to support the tire and a tire engaging stop to prevent movement of the wheel rim onto said ledge, means for supporting the wheel with its tire resting on said ledge, including a movable wheel-engaging member, a yoke adjustably straddling a part of the press, and a spring connecting said wheel-engaging member and said yoke for moving the wheel and retaining its tire in contact with said stop.

3. A tire remover comprising a base, a press including a standard rising from said base and a ledge upon which the tire rim rests, a hub-receiving collar slidable on said base, a yoke straddling said standard and having spaced openings in its arms, a spring connecting said collar and said yoke, and a pin passing through certain openings of said yoke arms and engaging said standard whereby to hold said spring under tension to retain the wheel tire against the standard.

In testimony whereof I have hereunto affixed my signature.

JOHN W. PENCE.